US011538120B2

(12) United States Patent
Lee

(10) Patent No.: US 11,538,120 B2
(45) Date of Patent: Dec. 27, 2022

(54) APPARATUS AND METHOD FOR PAYING A WIRELESS CHARGING FEE FOR AN ELECTRIC VEHICLE WHILE DRIVING

(71) Applicants: HYUNDAI MOTOR COMPANY, Seoul (KR); KIA MOTORS CORPORATION, Seoul (KR)

(72) Inventor: Won-Jun Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 255 days.

(21) Appl. No.: 16/670,479

(22) Filed: Oct. 31, 2019

(65) Prior Publication Data

US 2020/0193533 A1 Jun. 18, 2020

(30) Foreign Application Priority Data

Dec. 12, 2018 (KR) .................. 10-2018-0159961

(51) Int. Cl.
*G06Q 50/06* (2012.01)
*G06Q 20/08* (2012.01)
(Continued)

(52) U.S. Cl.
CPC .............. *G06Q 50/06* (2013.01); *B60L 53/12* (2019.02); *B60L 53/665* (2019.02);
(Continued)

(58) Field of Classification Search
CPC .. G06Q 50/06; G06Q 20/0855; G06Q 20/102; G06Q 20/145; G06Q 20/3224;
(Continued)

(56) References Cited

U.S. PATENT DOCUMENTS

2004/0206817 A1* 10/2004 Grant ................... G07B 15/063
235/384
2009/0231161 A1* 9/2009 Malarky .............. G07B 15/063
340/933
(Continued)

FOREIGN PATENT DOCUMENTS

JP         2014-102695     *  6/2014  ............. G07B 15/00
KR       20160116235 A        10/2016
KR         101686734 B1       12/2016

OTHER PUBLICATIONS

Madslien, Jorn, "Why is Norway a case study for EVs?", just-auto global news, Bromsgrove, Nov. 22, 2017.*

*Primary Examiner* — Nathan Erb
(74) *Attorney, Agent, or Firm* — Lempia Summerfield Katz LLC

(57) ABSTRACT

An apparatus for paying a wireless charging fee for an electric vehicle while being driven may include: an electric power receiver configured to perform wireless charging of an electric vehicle; a toll fee payment processor configured to perform a fee collection processing with respect to the electric vehicle in response to a toll fee payment request from a gantry; and a controller configured to generate information on an accumulated charging amount of the electric vehicle before the electric vehicle passes through the gantry in response to the toll fee payment request from the gantry and transmit the information on the accumulated charging amount to the toll fee payment processor.

8 Claims, 3 Drawing Sheets

(51) Int. Cl.
  *G06Q 20/14* (2012.01)
  *G06Q 20/10* (2012.01)
  *G06Q 20/32* (2012.01)
  *B60L 53/66* (2019.01)
  *B60L 53/12* (2019.01)
  *H02J 7/02* (2016.01)

(52) U.S. Cl.
  CPC ....... *G06Q 20/0855* (2013.01); *G06Q 20/102* (2013.01); *G06Q 20/145* (2013.01); *G06Q 20/3224* (2013.01); *H02J 7/025* (2013.01); *B60Y 2200/91* (2013.01); *B60Y 2300/91* (2013.01); *G06Q 2240/00* (2013.01)

(58) Field of Classification Search
  CPC ... G06Q 2240/00; B60L 53/12; B60L 53/665; H02J 7/025; B60Y 2200/91; B60Y 2300/91
  See application file for complete search history.

(56) References Cited

U.S. PATENT DOCUMENTS

| | | | |
|---|---|---|---|
| 2016/0207413 A1* | 7/2016 | Atluri | H02J 7/00036 |
| 2017/0113619 A1* | 4/2017 | Boehm | B60R 1/04 |
| 2017/0124775 A1* | 5/2017 | Breed | G07B 15/00 |
| 2018/0009446 A1* | 1/2018 | Ricci | G06F 21/32 |
| 2018/0037136 A1* | 2/2018 | Nelson | B60L 53/51 |
| 2018/0212463 A1* | 7/2018 | van Boheemen | B60L 53/122 |
| 2019/0217726 A1* | 7/2019 | Covic | B60L 5/005 |

\* cited by examiner

APPARATUS AND METHOD FOR PAYING A WIRELESS CHARGING FEE FOR AN ELECTRIC VEHICLE WHILE DRIVING

CROSS-REFERENCE TO RELATED APPLICATIONS

This application claims priority to Korean Patent Application No. 10-2018-0159961, filed on Dec. 12, 2018, which is incorporated herein by reference in its entirety.

BACKGROUND

Field of the Disclosure

Various embodiments of the present disclosure relate to an apparatus and a method for processing a wireless charging fee for an electric vehicle while driving. More particularly, the disclosed apparatus and method facilitate payment of a charging fee for wireless charging of an electric vehicle (e.g., it may be a dynamic electric vehicle charging (DEVC) but not limited thereto) when traveling on a highway without visiting a separate agency by integrally collecting not only a toll fee but also the charging fee with respect to the electric vehicle while being driven.

Description of Related Art

Generally, an electric vehicle visits a separate charging facility and is charged when the vehicle is stationary. A charging fee is then calculated through a payment method using a credit card or the like of a driver. In other words, according to the related art, charging of an electric vehicle and payment are independently performed.

This is known as Halo technology. Halo technology is a technology in which, when an electric vehicle approaches the vicinity of a wireless charging pad, the electric vehicle is able to be charged without a cable. However, the charging efficiency thereof is lower than that of a currently installed domestic high-speed charger (50 kW) since three hours must minimally elapse until the electric vehicle is completely charged. In this case, wireless charging is possible, but it takes a long time. Therefore, there are inconveniences to the driver of the vehicle due to the stress caused by worrying about charging the vehicle but also due to having to directly seek a charging station.

Recently, research on wireless charging technology for traveling electric vehicles is underway. Typically, dynamic electric vehicle charging (DEVC) technology has been proposed by Qualcomm Technologies, Inc. Even though an electric vehicle is traveling over a speed of 100 km/h, this DEVC technology enables 20 kW class wireless charging.

As described above, since the DEVC technology enables wireless charging on an electric vehicle which is traveling, it is possible to reduce the inconvenience of a driver who should visit a high-speed charging station or a low-speed charging station during a long journey. In particular, when the DEVC technology is first applied to a highway other than a general road, it is possible to enable long distance traveling through wireless charging even on an electric vehicle otherwise capable of traveling only for a short distance within a mileage of 200 km.

However, when the DEVC technology is commercialized, a fee collecting method for a charging fee is not yet provided. Further, when the DEVC technology is applied to a highway, a new technique is required for completing charging of an electric vehicle and payment therefor when the electric vehicle is traveling.

SUMMARY

The present disclosure is directed to an apparatus and a method for processing a wireless charging fee for an electric vehicle while driving. The apparatus and the method facilitate payment of a charging fee for wireless charging of an electric vehicle (e.g., it may be a dynamic electric vehicle charging (DEVC) but not limited thereto) when the vehicle is traveling on a highway without visiting a separate agency. The payment is facilitated by integrally collecting not only a toll fee but also the charging fee with respect to the electric vehicle while driving.

Other objects and advantages of the present disclosure can be understood by the following description and become apparent with reference to the embodiments of the present disclosure. Also, it is obvious to those having ordinary skill in the art to which the present disclosure pertains that the objects and advantages of the present disclosure can be realized by the means as claimed and combinations thereof.

In accordance with an embodiment of the present disclosure, an apparatus is provided for paying a wireless charging fee for an electric vehicle while driving. The apparatus includes an electric power receiver configured to perform wireless charging of an electric vehicle while driving. The apparatus further includes a toll fee payment processor configured to perform a fee collection processing with respect to the electric vehicle in response to a toll fee payment request from a gantry. The apparatus also includes a controller configured to generate information on an accumulated charging amount of the electric vehicle before the electric vehicle passes through the gantry in response to the toll fee payment request from the gantry and transmit the information on the accumulated charging amount to the toll fee payment processor.

The toll fee payment processor may transmit the information on the accumulated charging amount while transmitting vehicle information for a toll fee payment in response to the toll fee payment request from the gantry.

The gantry may transmit the vehicle information and the information on the accumulated charging amount to a management server. The management server may perform a fee collection processing for the toll fee using the vehicle information and for a charging fee using the information on the accumulated charge amount.

The controller may calculate the accumulated charging amount of which the wireless charging is performed on a battery of the electric vehicle through a wireless charging pad by being interlocked with the electric power receiver.

In accordance with another embodiment of the present disclosure, a method is provided of paying a wireless charging fee for an electric vehicle while being driven. The method includes generating, by a controller, information on an accumulated charging amount while performing wireless charging on an electric vehicle. The method further includes, when a fee collection processing is performed on the electric vehicle in response to a toll fee payment request from a gantry, transmitting, by the controller, the information on the accumulated charging amount to the gantry before the electric vehicle passes through the gantry. The method also includes receiving, by the controller, a result of the fee collection processing for a charging fee as a result of the transmitting of the information of the accumulated charging amount from the gantry.

The transmitting of the information of the accumulated charging amount may include transmitting, by the controller, the vehicle information for a toll fee payment in response to the toll fee payment request from the gantry.

The information on the accumulated charging amount may be used in the fee collection processing for the charging fee by the management server. The vehicle information may be used in the fee collection processing for a toll fee by the management server.

In accordance with still another embodiment of the present disclosure, a method is provided of paying a wireless charging fee for an electric vehicle while driving. The method includes generating, by a management server, information on an accumulated charging amount by checking charging amounts from one or more wireless charging pads which perform wireless charging on a battery of an electric vehicle while being driven. The method further includes, when a fee collection processing is performed on a toll fee of the electric vehicle while driving through a predetermined gantry by a management server, simultaneously performing the fee collection processing on a charging fee using the information on the accumulated charging amount.

The generating of the information on the accumulated charging amount may include generating, by the management server, the information on the accumulated charging amount before the electric vehicle is driven past the predetermined gantry.

DESCRIPTION OF SPECIFIC EMBODIMENTS

Figure 1:
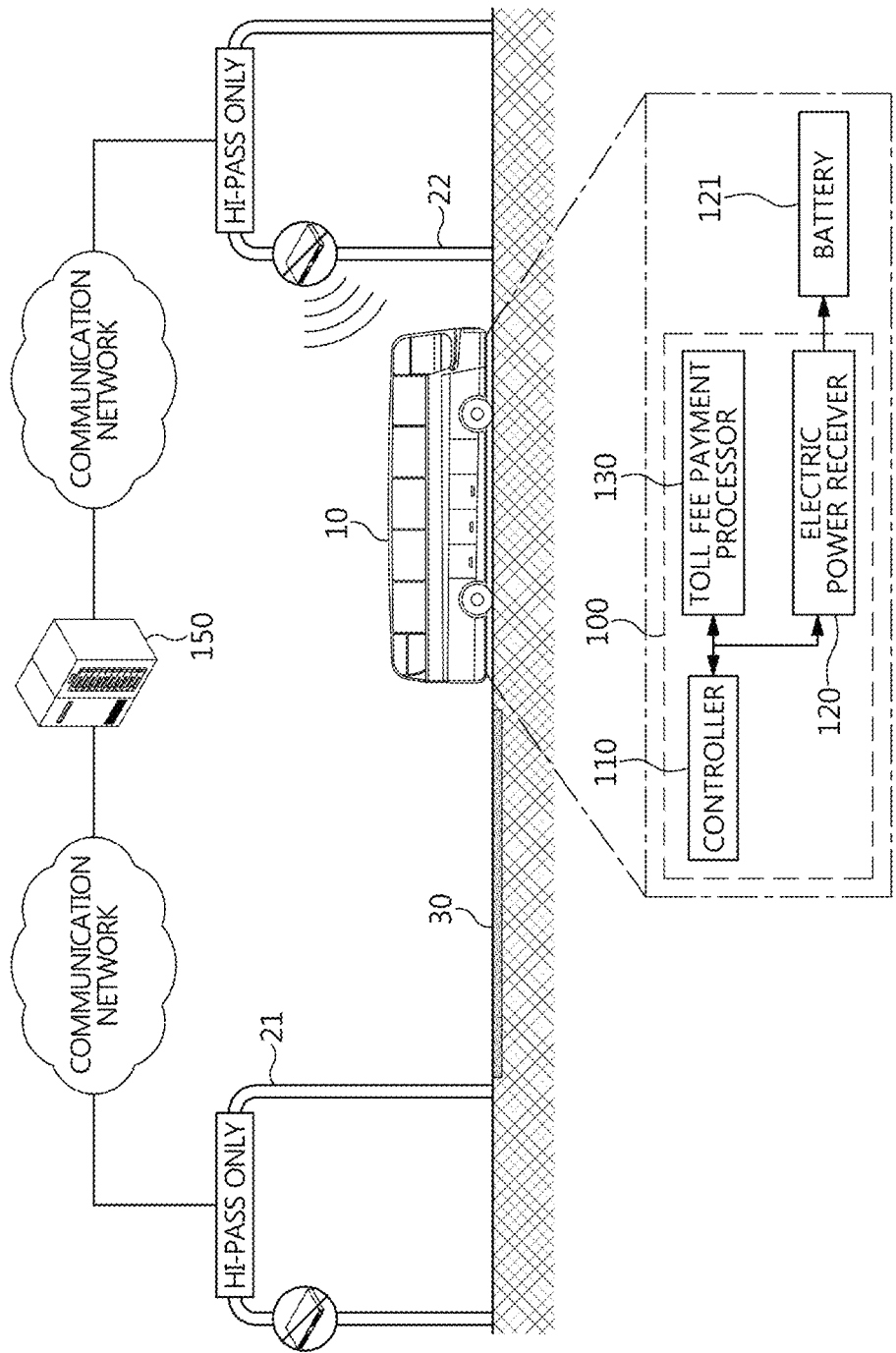
FIG. 1 is a diagram illustrating a highway toll fee payment system according to an embodiment of the present disclosure.

Hereinafter, embodiments of the present disclosure are described in detail with reference to the accompanying drawings. However, in the following description and the accompanying drawings, if it is determined that well-known functions or configurations may obscure the gist of the present disclosure, detailed descriptions thereof will be omitted. Further, it is noted that the same components are denoted by the same reference numerals throughout the drawings.

Terms or words used herein and the appended claims should not be construed to be limited to ordinary or dictionary meanings. These terms or words should be construed in accordance with the meaning and concept consistent with the technical spirit of the present disclosure according to the principle in that inventors can properly define concepts of terms in order to describe their inventions with the best manner.

Therefore, the embodiments described in the present disclosure and the configurations illustrated in the drawings are merely embodiments of the present disclosure, and do not represent all the technical spirits of the present disclosure. It should be understood that various equivalents and modifications, which are capable of replacing the embodiments and the configurations, are possible at the time of filing the present application.

Some components are exaggerated, omitted, or schematically illustrated in the accompanying drawings shown, and a size of each component does not substantially reflect an actual size thereof. The present disclosure is not limited by a relative size or a spacing illustrated in the accompanying drawings.

When a component is referred to as "being included" in a portion, this means that other component may be further included rather than not be included in the portion unless the context clearly describes otherwise. Further, when a portion is referred to as being "connected to" other portion, this includes not only "being directly connected to" but also "being electrically connected to" by interposing another element between the portion and the other portion.

Unless the context clearly dictates otherwise, the singular form includes the plural form. It should be understood that terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof Further, a term "part" used herein refers to software or a hardware component such as a field programmable gate array (FPGA) or an application specific integrated circuit (ASIC) and performs predetermined functions. However, the meaning of the "part" is not limited to software or hardware. The "part" may be configured to reside on an addressable storage medium or may be configured to playback one or more processors. For example, the "part" includes components, such as software components, object oriented software components, class components, and task components, processes, functions, procedures, subroutines, segments of a program code, drivers, firmware, microcode, a circuit, data, a databases, data structures, tables, arrays, and variables. A function provided in the components and the "part" may be combined into a smaller number of components and "parts" or may be further divided into additional components and "parts."

Embodiments of the present disclosure are fully described in detail below which are suitable for implementation by those having ordinary skill in the art to which is the present disclosure pertains with reference to the accompanying drawings. However, the present disclosure may be implemented in various different forms, and thus it is not limited to embodiments to be described herein. In the drawings, some portions not related to the description will be omitted in order to clearly describe the present disclosure, and similar reference numerals are given to similar components throughout the disclosure.

Hereinafter, various embodiments of the present disclosure will be described in detail with reference to the accompanying drawings.

FIG. 1 is a diagram illustrating a highway toll fee payment system according to an embodiment of the present disclosure.

As shown in FIG. 1, a highway toll fee payment system (a so-called hi-pass system) according to an embodiment of the present disclosure allows a facile payment of a charging fee for wireless charging of an electric vehicle 10 when the vehicle is traveling on a highway without visiting a separate agency by integrally collecting not only a toll fee but also the charging fee with respect to the electric vehicle 10 in the state of traveling.

The highway toll fee payment system may be applied to not only a closed type system but also an open type system with regard to a highway toll fee billing method.

In other words, the highway toll fee billing system processes a highway toll fee with respect to the electric vehicle 10 passing through a toll fee payment gantry installed at a tollgate of a highway. When a wireless charging fee of the electric vehicle 10 is not paid before passing through a corresponding gantry, the highway toll fee billing system checks an accumulated charging amount to process a payment of the wireless charging fee together with the highway toll fee.

Therefore, in the case of a closed type highway, the highway toll fee payment system processes a highway toll fee at an exit gantry so that, at the exit gantry, the highway toll fee payment system checks an accumulated charging amount of the electric vehicle 10 between an entry gantry and the exit gantry to process a payment of the highway toll fee together with a charging fee.

Further, in the case of an open type highway, the highway toll fee payment system processes a highway toll fee at every gantry through which the electric vehicle 10 passes so that the highway toll fee payment system checks an accumulated charging amount of the electric vehicle 10, which is not processed at a corresponding gantry, to process a payment of the highway toll fee together with a charging fee.

Referring to FIG. 1, in the case of a closed type highway, the highway toll fee payment system does not process a payment of a highway toll fee at a first gantry 21 which is an entry gantry and processes the payment of the highway toll fee at a second gantry 22 which is an exit gantry. In this case, the highway toll fee payment system processes the payment of the highway toll fee and a charging fee when the electric vehicle 10 passes through the second gantry 22.

In the case of an open highway, the highway toll fee payment system processes a payment at both of the first gantry 21 and the second gantry 22. In this case, the highway toll fee payment system is in a state of completely processing a charging fee for a previous accumulated charging amount when the electric vehicle 10 passes the first gantry 21, and when the electric vehicle 10 passes through the second gantry 22, the highway toll fee payment system processes a payment of an accumulated charging amount between the first gantry 21 and the second gantry 22.

Consequently, the highway toll fee payment system may process a payment of a charging fee by checking whether a previous accumulated charging amount of the electric vehicle 10 is present at the time when the electric vehicle 10 passes through a gantry regardless of a highway toll fee billing method.

When traveling, the electric vehicle 10 performs wireless charging through a wireless charging pad 30 which is embedded in at least one position of a highway.

The above-described "charging fee" corresponds to a fee billed for an accumulated charging amount wirelessly charged to the electric vehicle 10 via the wireless charging pad 30. Alternatively, the charging fee may be summed with a fee billed for a charging amount of which the electric vehicle 10 is charged via a general charger installed at highway facilities (e.g., a highway service area and the like).

To this end, the highway toll fee payment system according to an embodiment of the present disclosure includes a wireless charging fee processing device 100 installed at the electric vehicle 10, and a management server 150 linked to the first gantry 21 and the second gantry 22.

Hereinafter, the highway toll fee payment system is described by being divided into a first embodiment (see FIG. 2 which will be described below) and a second embodiment (see FIG. 3 which will be described below) according to a principal agent calculating an accumulated charging amount of the electric vehicle 10. In other words, in the first embodiment, the wireless charging fee processing device 100 (specifically, a controller 110 which is described below) calculates an accumulated charging amount of the electric vehicle 10, whereas in the second embodiment, the management server 150 calculates the accumulated charging amount of the electric vehicle 10.

First, according to the first embodiment, the wireless charging fee processing device 100 calculates an accumulated charging amount whenever wireless charging is performed on the electric vehicle 10 when traveling after the electric vehicle 10 passes through the first gantry 21.

In this case, when the electric vehicle 10 is checked as passing through the second gantry 22, the management server 150 calculates a charging fee for an accumulated charging amount transmitted from the wireless charging fee processing device 100, adds a toll fee of the electric vehicle 10 to the calculated charging fee, and performs a fee collection processing.

In other words, when the electric vehicle 10 is passing through the second gantry 22, the management server 150 calculates the charge fee for the accumulated charging amount of the electric vehicle 10 before the electric vehicle 10 passes through the second gantry 22 and then performs the fee collection processing.

This is equally applied regardless of a highway toll fee billing method.

First, in the case of a closed type highway toll fee billing method, since the fee collection processing is performed at the second gantry 22, a charging fee for the accumulated charging amount of the electric vehicle 10 between the first gantry 21 and the second gantry 22 is calculated.

In the case of an open type highway toll fee billing method, since the fee collection processing is performed at both of the first gantry 21 and the second gantry 22, the fee collection processing is performed on a charging fee for the accumulated charging amount of the electric vehicle 10 at the first gantry 21 before the electric vehicle 10 passes through the first gantry 21. The fee collection processing is performed on a charging fee for the accumulated charging amount of the electric vehicle 10 at the second gantry 22 before the electric vehicle 10 passes through the second gantry 22.

Consequently, the open type highway toll fee billing method is in a form in which the closed type highway toll fee billing method is continuously performed. The fee collection processing is repeatedly performed on a gantry section between the first gantry 21 and the second gantry 22.

To this end, the wireless charging fee processing device 100 includes the controller 110, an electric power receiver 120, and a toll fee payment processor 130.

The controller 110 recognizes that the electric vehicle 10 passes through the first gantry 21 and the second gantry 22 through the toll fee payment processor 130 which plays role of a function as a terminal for a toll fee payment.

The controller 110 calculates an accumulated charging amount of which the wireless charging is performed on the electric vehicle 10 through the wireless charging pad 30 at one or more positions from a time when the electric vehicle 10 passes through the first gantry 21 to a time when the electric vehicle 10 passes through the second gantry 22. In this case, the controller 110 checks the accumulated charging amount of which the wireless charging is performed on the electric vehicle 10 by being interlocked with the electric power receiver 120 through the wireless charging pad 30. In this embodiment, when the electric power receiver 120 detects an electric power signal of the wireless charging pad 30, the electric power receiver 120 performs wireless charging on a battery 121. In this embodiment, the controller 110 stores information on the accumulated charging amount of which the wireless charging is performed on the electric vehicle 10 in a memory (not shown).

When the electric vehicle 10 passes through the second gantry 22, a payment request is transmitted to the controller 110 from the second gantry 22 via the toll fee payment processor 130. In this case, the controller 110 transmits the information on the accumulated charging amount, which is read from the memory, to the toll fee payment processor 130. Then, the toll fee payment processor 130 transmits vehicle information for a toll fee payment and the information on the accumulated charging amount for a charging fee payment to the second gantry 22.

Subsequently, the second gantry 22 transmits the vehicle information and the information on the accumulated charging amount to the management server 150. In this case, the management server 150 performs a fee collection processing for a toll fee using the vehicle information and for a charging fee using the information on the accumulated charging amount.

In this embodiment, since the toll fee may be calculated through a conventional method, a detailed description thereof is omitted. The charging fee may be calculated by multiplying the "accumulated charging amount" and a unit cost per unit charging amount according to a kind of vehicle.

Then, the management server 150 transmits the result of the fee collection processing to the toll fee payment processor 130 via the second gantry 22. In this case, the toll fee payment processor 130 visually and auditorily notifies a driver of the result of the fee collection processing through a display device and a speaker.

Next, according to the second embodiment, after the electric vehicle 10 is checked as passing through the first gantry 21, the management server 150 checks a charging amount of the electric vehicle 10 in real time by verifying the result of a charging progress of the battery 121 of the electric vehicle 10 through the wireless charging pad 30. Thereafter, the management server 150 performs the fee collection processing when the electric vehicle 10 is checked as passing through the second gantry 22 while calculating the accumulated charging amount of the electric vehicle 10.

Figure 2:
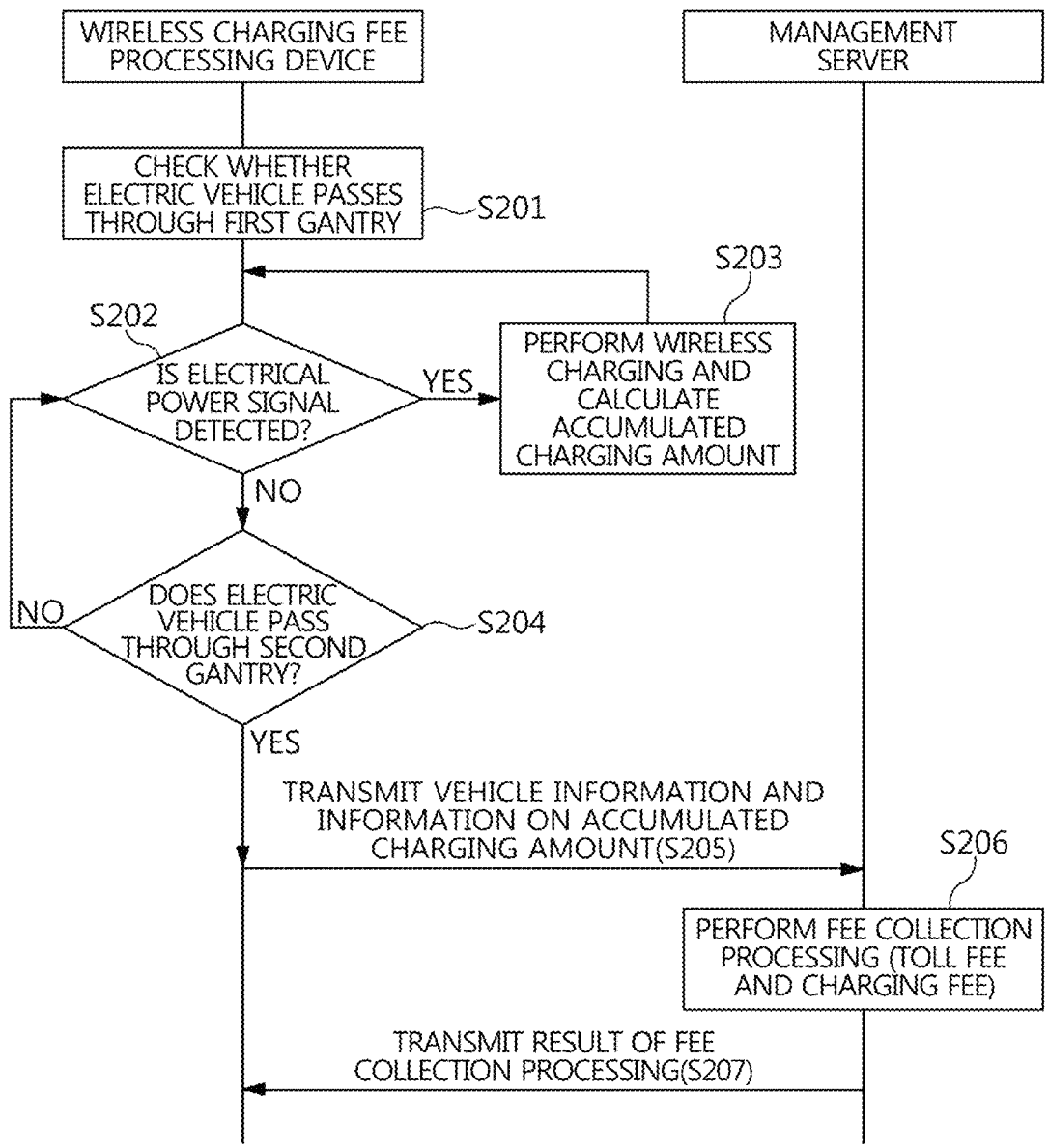
FIG. 2 is a flowchart illustrating a method of processing a wireless charging fee for an electric vehicle while being driven according to a first embodiment of the present disclosure.

FIG. 2 is a flowchart illustrating a method of processing a wireless charging fee for an electric vehicle while being driven according to a first embodiment of the present disclosure.

The wireless charging fee processing device 100 checks whether the electric vehicle 10 passes through the first gantry 21 and then determines whether an electric power signal is detected from the wireless charging pad 30 embedded in a highway (S201 and S202).

In this case, when the electric power signal is sensed from the wireless charging pad 30 (S202), the wireless charging fee processing device 100 calculates an accumulated charging amount whenever wireless charging is performed on the battery 121 (S203). This process is repeatedly performed on the wireless charging pad 30 which is embedded in at least one position before the electric vehicle 10 passes through the second gantry 22.

Accordingly, when before the electric vehicle 10 passes through the second gantry 22 (S204), the wireless charging fee processing device 100 repeatedly performs operations S202 and S203.

Otherwise, when the electric vehicle 10 passes through the second gantry 22 (S204), the wireless charging fee processing device 100 transmits the vehicle information and the information on the accumulated charging amount to the management server 150 via the second gantry 22 (S205). In this case, the wireless charging fee processing device 100 receives the payment request from the second gantry 22.

Thereafter, the management server 150 performs the fee collection processing for the toll fee and the charging fee of the electric vehicle 10 (S206). In other words, the management server 150 performs the fee collection processing by summing the toll fee and the charging fee of the electric vehicle 10.

In this case, the management server 150 transmits the result of the fee collection processing to the wireless charging fee processing device 100 (S207). The wireless charging fee processing device 100 notifies the driver of the result of the fee collection processing.

Figure 3:
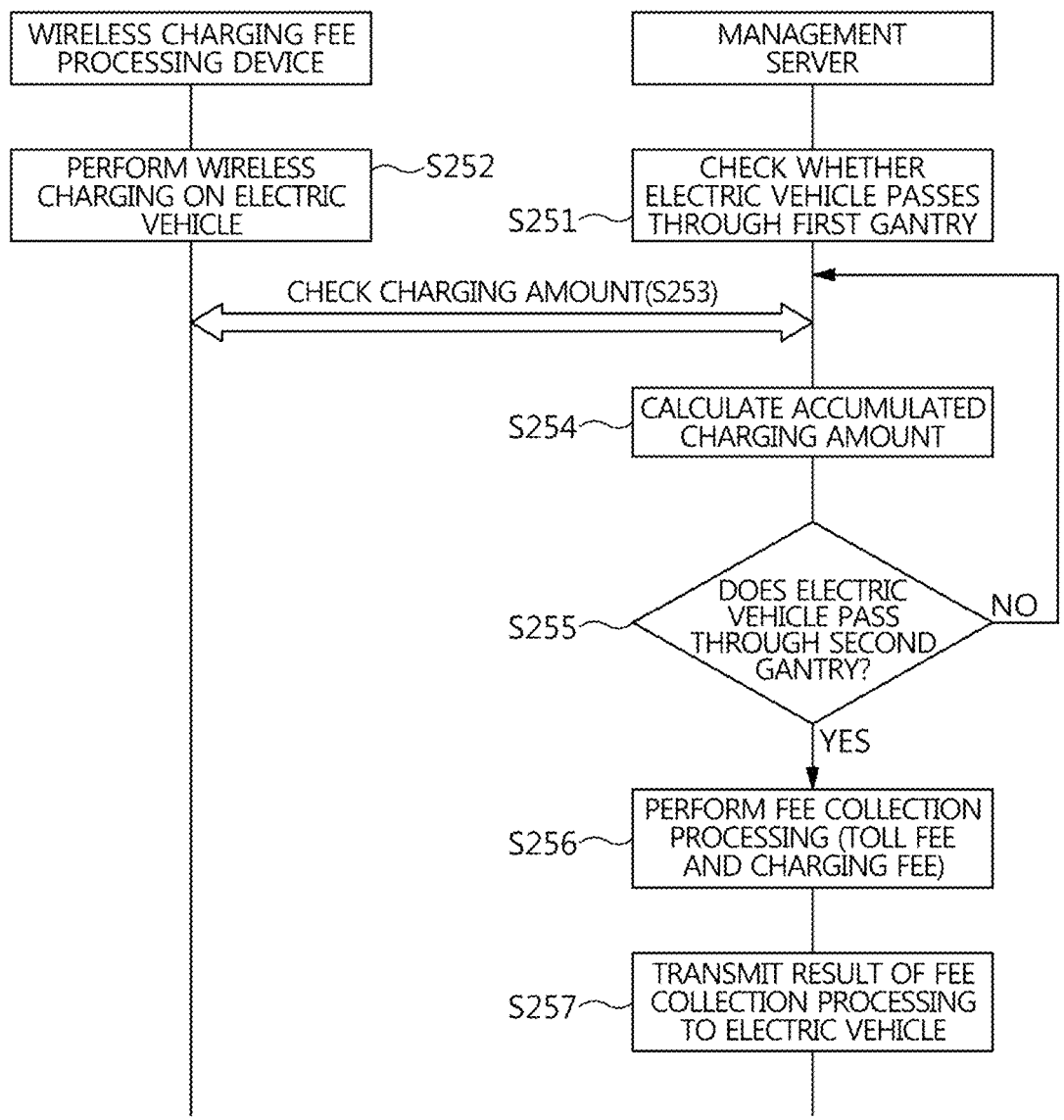
FIG. 3 is a flowchart illustrating a method of processing a wireless charging fee for an electric vehicle while being driven according to a second embodiment of the present disclosure.

FIG. 3 is a flowchart illustrating a method of processing a wireless charging fee for an electric vehicle while being driven according to a second embodiment of the present disclosure.

The management server 150 checks whether the electric vehicle 10 passes through the first gantry 21 and then verifies a wireless charging progress of the electric vehicle 10 through the wireless charging pad 30 (S251 and S252). In this case, the management server 150 checks a charging amount of the electric vehicle 10 through the wireless charging pad 30 (S253). In this embodiment, the management server 150 may verify identification information on the electric vehicle 10 through the wireless charging pad 30.

As described above, the management server 150 calculates the accumulated charging amount of which the wireless charging performed on the electric vehicle 10 through the wireless charging pad 30 embedded at one or more positions (S254).

This process is repeatedly performed on the wireless charging pad 30 which is embedded in at least one position before the electric vehicle 10 passes through the second gantry 22.

Accordingly, when the electric vehicle 10 does not yet pass through the second gantry 22 (S255), the management server 150 repeatedly performs operations S253 and S254.

Otherwise, when the electric vehicle 10 passes through the second gantry 22 (S255), the management server 150 performs the fee collection processing on the charging fee using the information on the accumulated charging amount while performing the fee collection processing on the toll fee using the vehicle information transmitted from the electric vehicle 10 (S256). In this case, the management server 150 performs the fee collection processing by summing the toll fee and the charge fee. Thereafter, the management server 150 transmits the result of the fee collection processing to the electric vehicle 10 (S257).

The method according to some embodiments may be implemented in the form of a program command which is executable through various computer means and be recorded in a computer-readable medium. The computer-readable medium may include program instructions, data files, data structures, and the like in alone or a combination thereof. The program command recorded in the computer-readable medium may be specially designed and configured for the present disclosure or may be known and available to those having ordinary skill in the computer software. Examples of the computer-readable recording media include magnetic media such as a hard disk, a floppy disk, and a magnetic tape, optical recording media such as a compact disc read only memory (CD-ROM) and a digital versatile disc (DVD), a magneto-optical medium such as a floptical disk, and hardware devices specifically configured to store and execute program commands, such as a read only memory (ROM), a random access memory (RAM), a flash memory, and the like. Examples of the program instructions include machine language codes generated by a compiler, as well as high-level language codes which are executable by a computer using an interpreter or the like.

In accordance with the present disclosure, a toll fee as well as a charging fee are integrally paid with respect to an electric vehicle while driving such that it is possible to conveniently settle the charging fee for wireless charging of the electric vehicle in a state of traveling on a highway without visiting a separate agency.

Further, in accordance with the present disclosure, a fee payment is solved according to commercialization of wireless charging technology such that it is possible to resolve a capacity problem of a battery of the electric vehicle by allowing full-scale wireless charging while the electric vehicle is traveling. This allows for the electric vehicle of reduction in capacity and weight of the battery.

Furthermore, in accordance with the present disclosure, it is possible to increase convenience by simultaneously charging and payment in conjunction with the electric vehicle.

Moreover, in accordance with the present disclosure, it is possible to secure information on power consumption according to a kind of vehicle and a district by transmitting power consumption of the electric vehicle. This is expected to increase efficiency of electrical power supply and demand for the electric vehicle by helping analysis on the demand for electrical power.

Although the foregoing description has been described with a focus on novel features of the present disclosure as being applied to various embodiments, those having ordinary skill in the art may appreciate that various deletions, substitutions, and alterations can be made from the forms and details of the above-described apparatus and method without departing from the scope of the present disclosure. Accordingly, the scope of the present disclosure is defined by the appended claims rather than the foregoing description. All variations equivalent to the scope of the appended claims will fall within the scope of the present disclosure.

While the present disclosure has been described with respect to the specific embodiments, it will be apparent to those having ordinary skill in the art that various changes and modifications may be made without departing from the spirit and scope of the disclosure as defined in the following claims. Accordingly, it should be noted that such alternations or modifications fall within the claims of the present disclosure, and the scope of the present disclosure should be construed based on the appended claims.

What is claimed is:

1. An apparatus for paying a wireless charging fee and a toll fee for an electric vehicle while being driven, the apparatus comprising:
    an electric power receiver configured to detect an electric power signal of a wireless charging pad embedded in at least one position in a highway and to perform wireless charging on a battery of the electric vehicle;
    a gantry including a first gantry and a second gantry configured to process a toll fee and a charging fee payment;
    a toll fee payment processor configured to perform a fee collection processing with respect to the electric vehicle in response to a toll fee payment request from the first gantry or the second gantry; and
    a controller configured to generate information on an accumulated charging amount of the electric vehicle before the electric vehicle passes through the first gantry or the second gantry in response to the toll fee payment request from the first gantry or the second gantry, store the information on the accumulated charging amount in a non-transitory memory, and transmit the stored information on the accumulated charging amount to the toll fee payment processor,
    wherein the first gantry and the second gantry are linked to a management server configured to calculate a charging fee for the accumulated charging amount transmitted from the controller, add the toll fee of the electric vehicle to the calculated charging fee, and perform the fee collection processing,
    wherein the toll fee payment processor is configured to visually and auditorily notify a driver of a result of the fee collection processing through a display device and a speaker and to perform a simultaneous charging and payment to increase convenience of the driver,
    wherein the second gantry transmits the vehicle information and the information on the accumulated charging amount to the management server, and
    wherein the management server transmits the result of the fee collection processing to the toll fee payment processor via the second gantry, such that a full-scale wireless charging is available while the electric vehicle is traveling.

2. The apparatus of claim 1, wherein the toll fee payment processor transmits the information on the accumulated charging amount while transmitting vehicle information for the toll fee payment in response to the toll fee payment request from the gantry.

3. The apparatus of claim 1, wherein the controller calculates the accumulated charging amount of which the wireless charging is performed on the battery of the electric vehicle through the wireless charging pad by being interlocked with the electric power receiver.

4. A method of paying a wireless charging fee and a toll fee for an electric vehicle while being driven, the method comprising:
    detecting, by a controller, an electric power signal of a wireless charging pad embedded in at least one position in a highway and performing wireless charging on a battery of the electric vehicle;
    generating, by the controller, information on an accumulated charging amount and storing the information on the accumulated charging amount in a non-transitory memory while performing wireless charging on the electric vehicle by an electric power receiver;
    when a fee collection processing is performed on the electric vehicle in response to a toll fee payment request from a gantry, transmitting, by the controller, the information on the stored accumulated charging amount to the gantry before the electric vehicle passes through the gantry; and
    receiving, by the controller, a result of the fee collection processing for a charging fee and a toll fee as a result of the transmitting of the information of the accumulated charging amount from the gantry,
    wherein the gantry including a first gantry and a second gantry is configured to process a toll fee payment, and
    wherein the first gantry and the second gantry are linked to a management server configured to calculate a charging fee for the accumulated charging amount transmitted from the controller, add the toll fee of the electric vehicle to the calculated charging fee, and perform the fee collection processing, wherein the controller is configured to visually and auditorily notify a driver of the result of the fee collection processing through a display device and a speaker and to perform a simultaneous charging and payment to increase convenience of the driver, wherein the second gantry transmits the vehicle information and the information on the accumulated charging amount to the management server, and wherein the management server transmits the result of the fee collection processing to the controller via the second gantry, such that a full-scale wireless charging is available while the electric vehicle is traveling.

5. The method of claim 4, wherein the transmitting of the information of the accumulated charging amount includes transmitting, by the controller, the vehicle information for the toll fee payment in response to the toll fee payment request from the first gantry or the second gantry.

6. The method of claim 5, wherein:

the information on the accumulated charging amount is used in the fee collection processing for the charging fee by the management server; and the vehicle information is used in the fee collection processing for the toll fee by the management server.

7. A method of paying a wireless charging fee and a toll fee for an electric vehicle while being driven, the method comprising:

determining, by a management server, whether the electric vehicle passes through a gantry;

determining, by the management server, whether an electric power signal is detected from a wireless charging pad embedded in at least one position in a highway;

generating, by the management server, information on an accumulated charging amount by checking charging amounts from the wireless charging pad which perform wireless charging on a battery of the electric vehicle being driven and storing, by the management server, the information on the accumulated charging amount in a non-transitory memory; and when a fee collection processing is performed by the management server on a toll fee of the electric vehicle passing through a predetermined gantry, simultaneously performing, by the management server, the fee collection processing on a charging fee and a toll fee using the information on the accumulated charging amount, wherein the gantry including a first gantry and a second gantry is configured to process a toll fee payment, wherein the first gantry and the second gantry are linked to the management server, and wherein the performing of the fee collection processing includes calculating the charging fee for the accumulated charging amount and adding the toll fee of the electric vehicle to the calculated charging fee, wherein the management server is configured to visually and auditorily notify a driver of a result of the fee collection processing through a display device and a speaker and to perform a simultaneous charging and payment to increase convenience of the driver, wherein the second gantry transmits the vehicle information and the information on the accumulated charging amount to the management server; and wherein the management server transmits the result of the fee collection processing to the electric vehicle via the second gantry, such that a full-scale wireless charging is available while the electric vehicle is traveling.

8. The method of claim 7, wherein the generating of the information on the accumulated charging amount includes generating, by the management server, the information on the accumulated charging amount before the electric vehicle being driven passes through the first gantry or the second gantry.

* * * * *